US009499022B2

(12) United States Patent
Pei et al.

(10) Patent No.: US 9,499,022 B2
(45) Date of Patent: Nov. 22, 2016

(54) AUXILIARY RUBBER SPRING FOR AUTOMOBILE SUSPENSION

(71) Applicant: AVIC BEIJING INSTITUTE OF AERONAUTICAL MATERIALS, Beijing (CN)

(72) Inventors: Gaolin Pei, Beijing (CN); Liangqing Lai, Beijing (CN); Gaosheng Chen, Beijing (CN); Honggang Jiang, Beijing (CN); Chunchao Tu, Beijing (CN); Zhian Mi, Beijing (CN); Jia Liu, Beijing (CN); Jinghe Wang, Beijing (CN); Zhengtao Su, Beijing (CN)

(73) Assignee: AVIC BEIJING INSTITUTE OF AERONAUTICAL MATERIALS, Beijing (CN)

( * ) Notice: Subject to any disclaimer, the term of this patent is extended or adjusted under 35 U.S.C. 154(b) by 0 days.

(21) Appl. No.: 14/424,674

(22) PCT Filed: Aug. 28, 2013

(86) PCT No.: PCT/CN2013/082463
§ 371 (c)(1),
(2) Date: Feb. 27, 2015

(87) PCT Pub. No.: WO2014/032591
PCT Pub. Date: Mar. 6, 2014

(65) Prior Publication Data
US 2015/0217616 A1    Aug. 6, 2015

(30) Foreign Application Priority Data

Aug. 28, 2012 (CN) .......................... 2012 1 0311009

(51) Int. Cl.
*B60G 11/22* (2006.01)
*F16F 1/40* (2006.01)
(52) U.S. Cl.
CPC ................. *B60G 11/22* (2013.01); *F16F 1/40* (2013.01); *B60G 2202/14* (2013.01); *B60G 2202/143* (2013.01); *B60G 2206/42* (2013.01)

(58) Field of Classification Search
CPC ...... B60G 11/22; B60G 2202/143; F16F 1/40
See application file for complete search history.

(56) References Cited

U.S. PATENT DOCUMENTS 2,982,536 A * 5/1961 Kordes ..................... F16F 1/40
267/153
3,467,353 A * 9/1969 Peterson ................... F16F 1/38
138/143

(Continued)

FOREIGN PATENT DOCUMENTS

| CN | 101234589 | 8/2008 |
| CN | 102518726 | 6/2012 |
| CN | 102829114 | 12/2012 |

OTHER PUBLICATIONS

International Search Report for international application No. PCT/CN2013/082463, dated Dec. 12, 2013 (6 pages).

*Primary Examiner* — Vishal Sahni
(74) *Attorney, Agent, or Firm* — Hamre, Schumann, Mueller & Larson, P.C.

(57) ABSTRACT

An auxiliary rubber spring for an automobile suspension, comprising: N layers of metal partitions, N being an integer greater than or equal to 1, and a transverse section of each metal partition being arc-shaped; N+1 rubber layers, the rubber layers being alternately lapped with the metal partitions, and a transversal section of each rubber layer being arc-shaped; a supporting plate provided with a first convex arc surface on one side thereof, the first convex arc surface being bonded to a first concave arc surface of an outermost rubber layer; and a connecting plate provided with a second concave arc surface on one thereof, the second concave arc surface being bonded to a second convex arc surface of another outermost rubber layer. The auxiliary rubber spring for an automobile suspension according to the present invention may increase fatigue resistance of the rubber spring and effectively extend service life thereof.

12 Claims, 3 Drawing Sheets

(56) References Cited

U.S. PATENT DOCUMENTS

| | | | | |
|---|---|---|---|---|
| 3,539,170 A * | 11/1970 | Hamel | ............... | B60G 11/22 105/198.7 |
| 3,575,403 A * | 4/1971 | Hamel | ............... | B61F 5/305 105/198.7 |
| 3,679,197 A | 7/1972 | Schmidt | | |
| 4,243,274 A * | 1/1981 | Greene | ............... | F16C 17/10 384/111 |
| 4,268,094 A * | 5/1981 | Greene | ............... | F16C 17/03 384/107 |
| 4,357,032 A * | 11/1982 | Kenyon | ............... | B60G 5/02 267/292 |
| 4,419,398 A * | 12/1983 | Coffy | ............... | B64C 27/35 267/152 |
| 4,754,958 A * | 7/1988 | Markowski | ............ | B64C 27/35 244/17.27 |
| 4,804,352 A * | 2/1989 | Schmidt | ............... | B64C 27/41 384/221 |
| 5,299,790 A * | 4/1994 | Whightsil, Sr. | ....... | E21B 19/006 267/141.2 |
| 2003/0164586 A1 | 9/2003 | Michael et al. | | |
| 2009/0218443 A1* | 9/2009 | Wereley | ............ | B64C 27/51 244/99.8 |
| 2009/0313917 A1* | 12/2009 | Takenoshita | ............ | E04H 9/022 52/167.7 |

* cited by examiner

AUXILIARY RUBBER SPRING FOR AUTOMOBILE SUSPENSION

FIELD OF THE INVENTION

The present invention relates to the technology of automobile suspension, and specially, to an auxiliary rubber spring for an automobile suspension.

BACKGROUND OF THE INVENTION

A suspension rubber spring, which is a main bearing component and a key component for a rubber suspension of a heavy-duty vehicle, comprises a plurality of metal sheets and a plurality of rubber layers laminated and bonded with the plurality of metal sheets, wherein the metal sheets act as a frame and a support, and the rubber layers act as a buffer and a connection.

Such a suspension rubber spring is disposed between a suspension mount and a balance beam, and is located between two main springs. The suspension rubber spring is positioned to cooperate with the main springs to support a weight of a vehicle body, absorb and eliminate vibration, increase friction threes between tyres and the ground as much as possible, ensure steering stability, improve automobile driving smoothness, decrease dynamic load on the vehicle body, increase service life of a automobile, and ensure comfortability of a passenger.

In recent years, products relating to road vehicle rubber suspension have been developed, and some of them have been experimented. However, structures of such suspension rubber springs are not perfect, and rubber parts of the suspension rubber springs tend to have a fatigue failure and thereby service life of the suspension rubber springs is relatively short.

Currently, service life of suspension rubber springs having a similar structure does not exceed 5,000 km when used in a heavy duty truck at home and abroad. A specific failure takes the form of crackles in an outer edge of each rubber layer, and the crackles are deeper in an outer edge of each rubber layer connecting with upper and lower partitions, which leads to a worst damage.

SUMMARY OF THE INVENTION

In order to solve the above mentioned and other technical problems, the present invention provides an auxiliary rubber spring for an automobile suspension, which may increase fatigue resistance and extend service life thereof.

According to embodiments of an aspect of the present invention, there is provided an auxiliary rubber spring for an automobile suspension, comprising: N layers of metal partitions, N being an integer greater than or equal to 1, and a transverse section of each metal partition being arc-shaped; N+1 rubber layers, the rubber layers being alternately lapped with the metal partitions, and a transversal section of each rubber layer being arc-shaped; a supporting plate provided with a first convex arc surface on one side thereof, the first convex arc surface being bonded to a first concave arc surface of an outermost rubber layer; and a connecting plate provided with a second concave arc surface on one side thereof, wherein the second concave arc surface is bonded to a second convex arc surface of another outermost rubber layer.

In the above auxiliary rubber spring for an automobile suspension, arc lengths of sections of respective rubber layers gradually increase in a thickness direction from the supporting plate to the connecting plate, such that surface areas of the rubber layers gradually increase.

In the above auxiliary rubber spring for an automobile suspension, arcs of the metal partitions, the rubber layers, the first convex arc surface, and the second concave arc surface have the same centre.

In the above auxiliary rubber spring for an automobile suspension, thicknesses of respective rubber layers increase in the thickness direction from the supporting plate to the connecting plate, and a change rate of thickness between adjacent rubber layers does not exceed 30%.

In the above auxiliary rubber spring for an automobile suspension, a connecting edge between each metal partition and an adjacent rubber layer is formed to have a transitional chamfer.

In the above auxiliary rubber spring for an automobile suspension, a length of a curve formed in a cross section by the transitional chamfer is within a range of 2~20 mm.

In the above auxiliary rubber spring for an automobile suspension, an elastic cover plate is provided on the other side of the supporting plate.

In the above auxiliary rubber spring for an automobile suspension, each of bonding portions between edges of the rubber layers and edges of corresponding metal partitions is encapsulated.

In the above auxiliary rubber spring for an automobile suspension, each rubber layer is provided with at least one hole therein.

In the above auxiliary rubber spring for an automobile suspension, the rubber layers and the metal partitions are provided with a through hole or a blind hole therein extending in the thickness direction.

In the auxiliary rubber spring for an automobile suspension according to the present invention, with an arch structure design of the metal partitions and the rubber layers having an arc shape, stress concentration during movement of the rubber spring can be effectively reduced, and fatigue resistance of the rubber spring can be considerably increased, and thus service life of the rubber spring can be extended.

Figure 1:
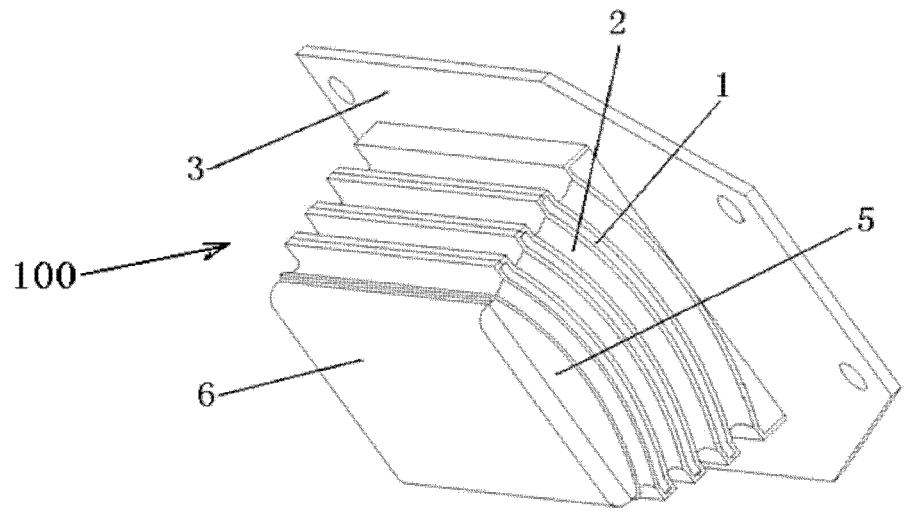
FIG. 1 is an illustrative perspective view showing an auxiliary rubber spring for an automobile suspension according to an exemplary embodiment of the present invention.
Figure 2:
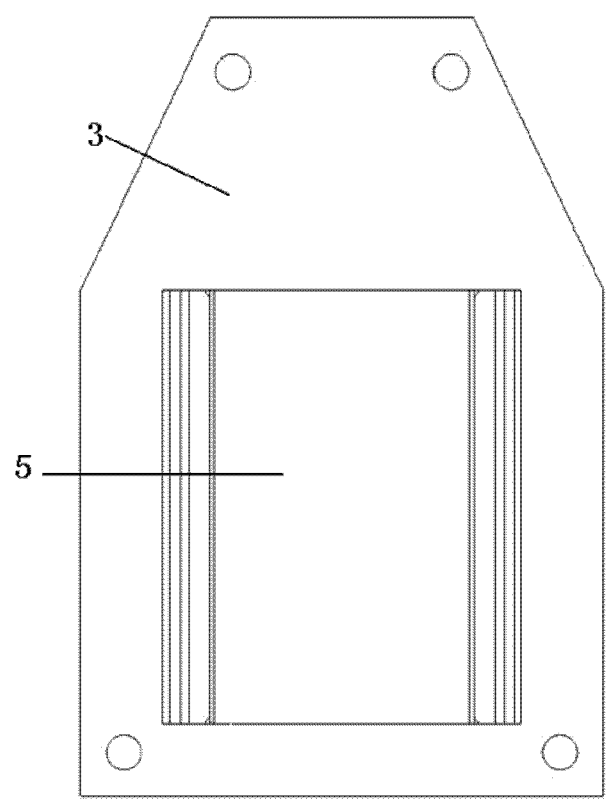
FIG. 2 is a bottom view showing the auxiliary rubber spring for an automobile suspension of FIG. 1.

A list of components in these figures:
1: metal partition
2: rubber layer
3: connecting plate
4: arc surface of second recess
5: supporting plate
6: cover plate
7: transitional chamfer
8: through hole or blind, hole
9: encapsulating layer

DETAILED DESCRIPTION OF PREFERRED EMBODIMENTS OF THE INVENTION

Exemplary embodiments of the present disclosure will be described hereinafter in detail with reference to the attached drawings, wherein the like reference numerals refer to the like elements. The embodiments described with reference to the attached drawings are exemplary and are used to explain the present invention and should not be construed as a limitation to the present invention.

An auxiliary rubber spring for an automobile suspension according to the present invention is disposed between a suspension mount and a balance beam, and is located between two main springs. The suspension rubber spring is positioned to cooperate with the main springs to support a weight of a vehicle body.

Figure 3:
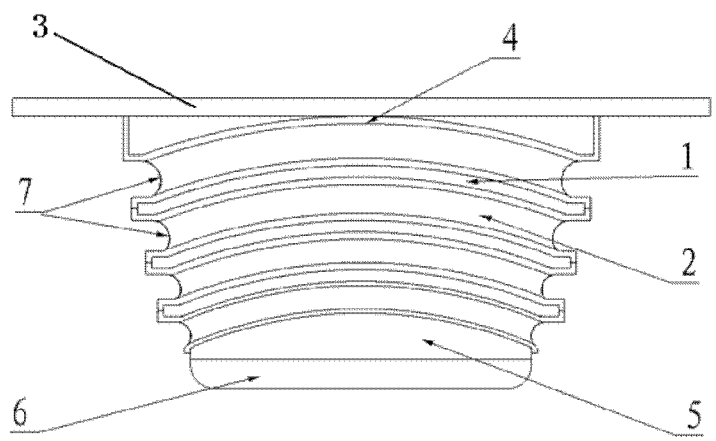
FIG. 3 is a plan view showing the auxiliary rubber spring for an automobile suspension of FIG. 1 in an axial direction.
Figure 4:
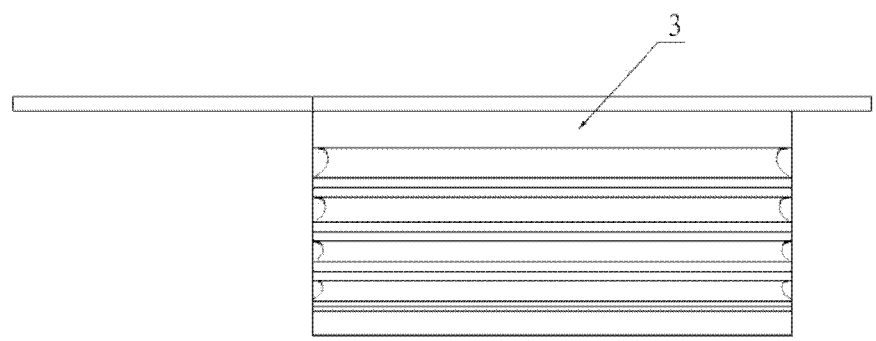
FIG. 4 is a plan view showing the auxiliary rubber spring for an automobile suspension of FIG. 1 in a lateral direction.

Please refer to FIGS. 1-4, an auxiliary rubber spring 100 for an automobile suspension according to an exemplary embodiment of the present invention comprises N layers of metal partitions, N+1 rubber layers 2, a connecting plate 3, and a supporting plate 5, where the N is an integer greater than or equal to 1. For example, 3 layers of metal partitions and 4 rubber layers 4 are shown in the figures. In other alternative embodiments, N may be 2, 4, 5, 6 or even a greater integer. A transversal section of each metal partition 1 has an arc shape, and a longitudinal section of each metal partition 1 has a straight line shape. The rubber layers 2 are alternately lapped with the metal partitions 1, a transversal section of each rubber layer 2 has an arc shape, and a longitudinal section of each rubber layer 2 has a straight line shape. One side of the supporting plate 5 is provided with a first convex arc surface, which is bonded to a first concave arc surface of an outermost rubber layer (the lowermost layer as shown in FIG. 3). One side of the connecting plate 3 is provided, with a second concave arc surface 4, which is bonded to a second convex arc surface of another outermost rubber layer (the uppermost layer as shown in FIG. 3).

In such a manner, the transversal section of the auxiliary rubber spring 100 for an automobile suspension of the present invention is in a shape of an inverted trapezoid in a thickness direction from the supporting plate 5 to the connecting plate 3. The metal partitions act as a frame and a support, and the rubber layers 2 act as a buffer and a connection. Each of the transversal sections of the metal partitions 1, rubber layers 2, and, the supporting plate 5 has a generally arch-shaped structure having a certain radian. Arcs of the metal partitions 1, the rubber layers 2, the first convex arc surface, and the second concave arc surface have the same centre, and radius of curvature of these arcs is less than 300 mm, preferably within a range of 150~250 mm, and even preferably 200 mm.

In the auxiliary rubber spring 100 for an automobile suspension of the present invention, the metal partitions 1 and the rubber layers 2 are alternately lapped with each other, the supporting plate 5 is connected, to the lowermost rubber layer and the uppermost rubber layer is disposed within the second concave arc surface 4 of the connecting plate 3. Arc lengths of sections of the rubber layers 2 gradually increase in the thickness direction from the supporting plate 5 to the connecting plate 3, such that surface areas of the rubber layers 2 gradually increase. With such a structure, fatigue resistance of the auxiliary rubber spring 100 for an automobile suspension may be improved and the auxiliary rubber spring will have a variable stiffness.

Further, the other side of the supporting plate 5 opposite to the first convex arc surface is provided, with an elastic cover plate 6. The cover plate 6 is made of plastic and is disposed on a planar side of the supporting plate 5 for reducing noises generated when the auxiliary rubber spring for an automobile suspension strikes the balance beam. The cover plate 6 may be made of rubber, resin, or other elastic materials other than plastic, and the supporting plate 5 may be a steel plate or another hard plate so as to have a sufficient rigidity to support the spring.

In a further embodiment of the auxiliary rubber spring 100 for an automobile suspension of the present invention, thicknesses of rubber layers 2 increase in the thickness direction from the supporting plate 5 to the connecting plate 3, and a change rate of thickness between adjacent rubber layers 2 does not exceed 30%. A distance H between a bottom end of the cover plate 6 and a top end of the connecting plate 3 is in a range from 50 mm to 300 mm, and preferably in a range from 100 mm to 200 mm, and more preferably, 140 mm. With such a configuration, a stress is uniformly distributed in each rubber layer 2, such that fatigue resistance is increased and service life is extended. For example, four rubber layers 2 are shown in FIG. 5 from the bottom up, a thickness h1 of a first rubber layer is 15 mm, a thickness h2 of a second rubber layer is 20 mm, a thickness h3 of a third rubber layer is 25 mm, and a thickness h4 of a fourth rubber layer is 30 mm.

Further, in the auxiliary rubber spring 100 for an automobile suspension of the present invention, a connecting edge between the metal partition 1 and its adjacent rubber layer 2 is formed to have a transitional chamfer R8. An extending length of a curve formed in a cross section by the transitional chamfer 88 is in a range of 2~20 mm, and preferably, 8 mm. With such a configuration, a stress at a bonding position between a rubber and a metal is reduced, and a service life can be increased.

Figure 5:
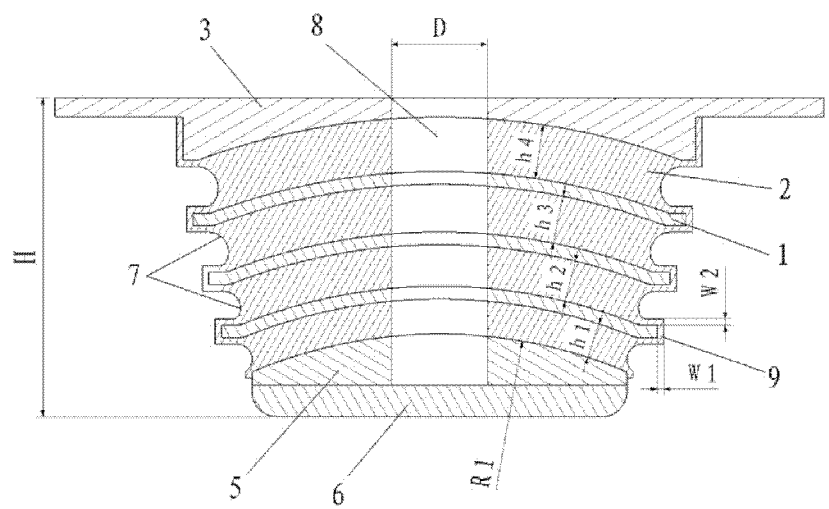
FIG. 5 is a sectional view showing a damping rubber spring for an automobile suspension according to another exemplary embodiment of the present invention.

In order to further improve the fatigue resistance of the auxiliary rubber spring for an automobile suspension, each of bonding portions between edges of the rubber layers 2 and edges of corresponding metal partitions 1 is encapsulated to form an encapsulating layer 9, as shown in FIG. 5. A thickness W1 of the encapsulating layer 9 on the side surface of the metal partition 1 and a thickness W2 of the encapsulating layer 9 on the upper and lower surfaces of the metal partition 1 are in a range of 1~3 mm, and preferably 2 mm.

FIG. 5 is a sectional view showing a damping rubber spring 100 for an automobile suspension according to another exemplary embodiment of the present invention. The damping rubber spring for an automobile suspension shown in FIG. 5 differs from the damping rubber spring for an automobile suspension shown in FIGS. 1-4 in that the rubber layers 2 and the metal partitions 1 are provided with a through hole or a blind hole 8 extending in the thickness direction, the rest of the structures are the same and thereby the same reference numbers are used and a description thereof is omitted. The through hole or blind hole 8 may increase fatigue resistance of the damping rubber spring for an automobile suspension. A diameter of the through hole or blind hole 8 may be within a range of 20~40 mm, and preferably 30 mm.

In an exemplary embodiment of the auxiliary rubber spring for an automobile suspension of the present invention, the number of rubber layers is 4, an arc radius R1 of the supporting plate is 200 mm, an arc length of the rubber layer connected with the supporting plate 5 is 390 mm, a thickness of the lowermost rubber layer is 15 mm, a difference between thicknesses of two adjacent rubber layers is 5 mm, a diameter of the radial through hole 8 in the rubber layers and metal partitions is 30 mm, the transitional chamfer is an arc chamfering and a radius of the chamfering is 8 mm, a total height of the auxiliary rubber spring for an automobile suspension is 140 mm, and a thickness of the encapsulating layer 7 at a bonding portion between an edge of each rubber layer and an edge of a metal partition is 2 mm. A rubber material for making the rubber layers is a natural rubber having a hardness of 70 (Shore Hardness), a material for the metal partitions, the supporting plate, and the connecting plate is steel, and a material for the cover plate is Nylon.

Figure 6:
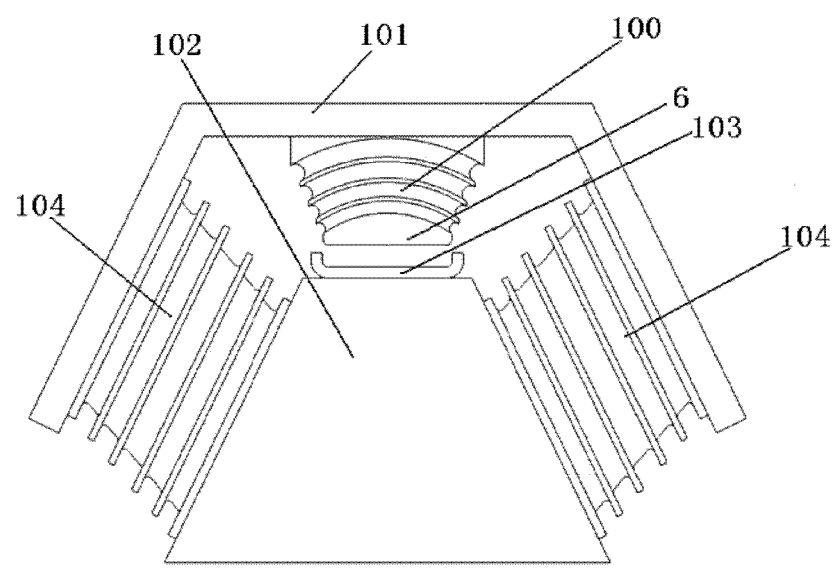
FIG. 6 is a schematic view showing an assembly in which an auxiliary rubber spring for an automobile suspension according to the present invention is used.

In the auxiliary rubber spring 100 for an automobile suspension according to the above embodiments of the present invention, as shown in FIG. 6, the connecting plate is connected to the suspension mount 101, for example, through bolts, and the cover plate 6 faces the balance beam 102. When a vehicle is in an unloaded state or a load thereon is relatively small, the cover plate 6 of the auxiliary rubber spring 100 for an automobile suspension does not directly contact the balance beam 102, that is, a distance exists therebetween; when a load of the vehicle is larger than a predetermined value, the cover plate 6 of the auxiliary rubber spring 100 for an automobile suspension directly contacts the balance beam 102 so as in to provide a buffering effect. Furthermore, in order to improve the buffering effect, a mounting pad 103 may be provided between the cover plate 6 and the balance beam 102, in each of spaces between inclined portions of the balance beam and two side walls of the suspension mount 101, there is provided a main spring 104. With an arch structure design of the metal partitions and the rubber layers having an arc shape, stress concentration during movement of the rubber spring can be effectively reduced, and fatigue resistance of the rubber spring can be considerably increased, and service life of the rubber spring can be extended. Additionally, with the damping rubber spring for an automobile suspension according to the present invention, driving smoothness of a vehicle can be improved, dynamic load on the body of the vehicle is reduced, and comfortability of a passenger is improved. It has been proven by experiments that, with the auxiliary rubber spring for an automobile suspension according to the present invention mounted in a vehicle, a service life of the rubber spring is considerably extended by 400% in contrast to those of existing rubber springs, the technical effect thereof is prominent, and it can provide a great economic benefit.

Although several exemplary embodiments have been shown and described, it would be appreciated by those skilled in the art that various changes or modifications may be made without departing from the scope and spirit of attached claims, and the present invention is not limited to the exemplary embodiments described in the specification.

What is claimed is:

1. An auxiliary rubber spring for an automobile suspension, comprising:
   N layers of metal partitions, N being an integer greater than or equal to 1, and a transverse section of each metal partition having an arc shape;
   N+1 rubber layers, the rubber layers being alternately lapped with the metal partitions, and a transversal section of each rubber layer having an arc shape;
   a supporting plate provided with a first convex arc surface on one side thereof, the first convex arc surface being bonded to a first concave arc surface of an outermost rubber layer; and
   a connecting plate provided with a second concave arc surface on one side thereof, the second concave arc surface being bonded to a second convex arc surface of another outermost rubber layer,
   wherein the rubber layers and the metal partitions are provided with a through hole or a blind hole therein extending in a thickness direction of the auxiliary rubber spring, the thickness direction extending between the supporting plate and the connecting plate, and
   wherein a top surface and a bottom surface of each metal partition is encapsulated by two adjacent rubber layers, and end surfaces of each metal partition are covered by an encapsulating layer.

2. The auxiliary rubber spring for an automobile suspension according to claim 1, wherein arc lengths of sections of respective rubber layers gradually increase in a thickness direction from the supporting plate to the connecting plate, such that surface areas of the rubber layers gradually increase.

3. The auxiliary rubber spring for an automobile suspension according to claim 1, wherein arcs of the metal partitions, the rubber layers, the first convex arc surface, and the second concave arc surface have a same center.

4. The auxiliary rubber spring for an automobile suspension according to claim 1, wherein thicknesses of respective rubber layers increase in the thickness direction from the supporting plate to the connecting plate, and a change rate of thickness between adjacent rubber layers does not exceed 30%.

5. The auxiliary rubber spring for an automobile suspension according to claim 1, wherein a connecting edge between each metal partition and an adjacent rubber layer is formed to have a transitional chamfer.

6. The auxiliary rubber spring for an automobile suspension according to claim 5, wherein the transitional chamfer is an arc chamfer.

7. The auxiliary rubber spring for an automobile suspension according to claim 1, wherein an elastic cover plate is provided on the other side of the supporting plate.

8. The auxiliary rubber spring for an automobile suspension according to claim 1, wherein the through hole or the blind hole extending in the thickness direction of the auxiliary rubber spring, the arcs of the metal partitions, the rubber layers, the first convex arc surface, and the second concave arc surface have a same center.

9. The auxiliary rubber spring for an automobile suspension according to claim 1, wherein the through hole or the blind hole extending in the thickness direction of the auxiliary rubber spring extends through the connecting plate and the supporting plate.

10. The auxiliary rubber spring for an automobile suspension according to claim 1, wherein the encapsulating layer is rubber.

11. A suspension for an automobile, comprising:
    a suspension mount;
    a balancing beam facing the suspension mount;
    two main springs, each of the main spring being connected between the suspension mount and the balancing beam; and
    an auxiliary rubber spring mounted to the suspension mount and separated from the balancing beam, the auxiliary rubber spring comprising:
       N layers of metal partitions, N being an integer greater than or equal to 1, and a transverse section of each metal partition having an arc shape;
       N+1 rubber layers, the rubber layers being alternately lapped with the metal partitions, and a transversal section of each rubber layer having an arc shape;
       a supporting plate provided with a first convex arc surface on one side thereof, the first convex arc surface being bonded to a first concave arc surface of an outermost rubber layer; and a connecting plate provided with a second concave arc surface on one side thereof, the second concave arc surface being bonded to a second convex arc surface of another outermost rubber layer, wherein the rubber layers and the metal partitions are provided with a through hole or a blind hole therein extending in a thickness direction of the auxiliary rubber spring, the thickness direction extending between the supporting plate and the connecting plate.

12. The suspension for an automobile according to claim 11, wherein a top surface and a bottom surface of each metal partition is encapsulated by two adjacent rubber layers, and end surfaces of each metal partition are covered by an encapsulating layer.

* * * * *